(12) United States Patent
Audhav et al.

(10) Patent No.: US 12,491,771 B2
(45) Date of Patent: Dec. 9, 2025

(54) VEHICLE ARRANGEMENT AND METHOD FOR BRAKING

(71) Applicant: Volvo Truck Corporation, Gothenburg (SE)

(72) Inventors: Tove Audhav, Landvetter (SE); Arne Andersson, Mölnlycke (SE)

(73) Assignee: Volvo Truck Corporation, Gothenburg (SE)

( * ) Notice: Subject to any disclaimer, the term of this patent is extended or adjusted under 35 U.S.C. 154(b) by 507 days.

(21) Appl. No.: 17/978,405

(22) Filed: Nov. 1, 2022

(65) Prior Publication Data

US 2023/0173927 A1    Jun. 8, 2023

(30) Foreign Application Priority Data

Dec. 7, 2021 (EP) .................................... 21212847

(51) Int. Cl.
  *B60L 7/26*    (2006.01)
  *B60T 1/06*    (2006.01)

(52) U.S. Cl.
  CPC .............. *B60L 7/26* (2013.01); *B60T 1/062* (2013.01); *B60L 2200/36* (2013.01)

(58) Field of Classification Search
  CPC ........ B60L 7/26; B60L 2200/36; B60T 1/062; B60T 1/10; B60T 8/323; B60T 7/20; B60T 8/1708; B60T 10/00
  See application file for complete search history.

(56) References Cited

U.S. PATENT DOCUMENTS

| 10,221,781 | B1 | 3/2019 | Hussain |
| 10,543,822 | B2* | 1/2020 | Morandi ................. B60T 13/22 |
| 2012/0201657 | A1 | 8/2012 | Donnelly et al. |

FOREIGN PATENT DOCUMENTS

| DE | 102019200921 A1 | 7/2020 |
| EP | 1270900 A1 | 1/2003 |

OTHER PUBLICATIONS

German Patent No. DE 112009002690 to Headlee et al.published on Oct. 11, 2012.*
German Patent No. DE 102018009705 to Schoenherr published on Jul. 4, 2019.*
European Patent No. EP 4194248 to Kvist et al.published on Jun. 14, 2023.*
Extended European Search Report for European Patent Application No. 21212847.4, mailed May 27, 2022, 8 pages.

* cited by examiner

*Primary Examiner* — Pamela Rodriguez
(74) *Attorney, Agent, or Firm* — Withrow & Terranova, PLLC (57) ABSTRACT

A vehicle arrangement for braking comprising at least a first electric motor comprising a first shaft being arranged to be mechanically connected to a drive shaft of the vehicle via a gearbox, and a braking compressor comprising a compressor shaft being arranged to be mechanically connected to the first shaft of the first electric motor via a compressor clutch, such that the first shaft drives the compressor shaft, wherein the first shaft is connected to the gearbox via a first motor clutch and a first gearbox shaft, the arrangement further comprising a mass flow rate controller arranged for controlling the air mass flow rate through the compressor. A method for controlling a vehicle arrangement, a method for braking a shaft of an electric motor, a control unit, a vehicle, a computer program and a computer readable medium.

23 Claims, 6 Drawing Sheets

VEHICLE ARRANGEMENT AND METHOD FOR BRAKING

RELATED APPLICATIONS

The present application claims priority to European Patent Application No. 21212847.4, filed on Dec. 7, 2021, and entitled "VEHICLE ARRANGEMENT AND METHOD FOR BRAKING," which is incorporated herein by reference in its entirety.

TECHNICAL FIELD

The invention relates to a vehicle arrangement for braking comprising at least a first electric motor. The invention further relates to a method for controlling a vehicle arrangement for braking, to a method for braking a motor shaft, to a control unit, a vehicle, a computer program and to a computer readable medium.

The invention can be applied in heavy-duty vehicles, such as trucks, buses and construction equipment, as well as lighter vehicles such as passenger cars. Although the invention will be described with respect to a truck, the invention is not restricted to this particular vehicle, but may also be used in other vehicles such as passenger cars.

BACKGROUND

In vehicles such as in heavy-duty vehicles there is a general need for braking involving dissipation of energy for example to complement friction braking in braking situations requiring prolonged and/or heavy braking.

In electrical vehicles such as vehicles comprising one or more electrical motors e.g. using batteries and/or fuel cell systems for propulsion, it is known to use different types of retarders or resistors for dissipating energy while braking and/or to use any batteries for storing such energy.

However, in braking situations when a relatively high brake power is required for substantial periods of time, it may be that the battery's limits for storing energy is reached before the end of the braking situation. Accordingly, the braking capacity using the battery for energy storage is limited.

As such, there is a need to provide alternative or complementary solutions for dissipating energy during braking of a vehicle, so as to replace and/or complement the storing of braking energy in the battery of an electric vehicle.

Known devices for dissipating braking energy are various types of retarders and/or resistors, which may be arranged for example to retard the drive shaft of a vehicle. Retarders and resistors often utilise the cooling fluid of a cooling system of the vehicle for dissipating the braking energy. As such, the use of retarders and/or resistors for dissipating braking energy may imply that the cooling system of the vehicle needs to be dimensioned to take care of this energy, resulting in relatively large demands e.g. for radiator area and fan performance in a cooling system.

As such, there is a need to provide alternative or complementary solutions for dissipating braking energy which does not necessarily utilise the cooling system for dissipating braking energy.

Further, there is a requirement for heavy vehicles that the braking system to provide the braking shall be engaged for use already before reaching a braking situation, such as before the vehicle reaches a downhill slope.

As such, there is a need to provide alternative or complementary solutions for dissipating braking energy during braking which enables engagement of the braking system before reaching a braking situation.

Further, there is a general requirement to provide smooth and secure braking, and to limit wear or risk of breakage of the components involved.

As such, there is a need to provide alternative or complementary solutions for dissipating energy during braking which are advantageous in view of wear, risk of breakage of components, and/or in view of providing smooth and secure braking.

SUMMARY

The object of the invention is to provide an alternative or an improvement in view of one or more of the above-mentioned needs.

According to a first aspect of the invention, at least one of the objects is achieved by a method.

Thus, there is provided a vehicle arrangement for braking comprising at least a first electric motor comprising a first shaft being arranged to be mechanically connected to a drive shaft of the vehicle via a gearbox, and a braking compressor comprising a compressor shaft being arranged to be mechanically connected to the first shaft of the first electric motor via a compressor clutch, such that the first shaft drives the compressor shaft.

The first shaft is connected to the gearbox via a first motor clutch and a first gearbox shaft. The vehicle arrangement further comprises mass flow rate controlling means arranged for controlling the air mass flow rate through the braking compressor.

As such, there is provided an arrangement in which the two clutches, i.e. the first motor clutch and the compressor clutch, allows for selectable engagement or disengagement of the first shaft to the first gearbox shaft, and of the braking compressor to the first shaft. As such, during braking of the vehicle, the first motor clutch and the compressor clutch may both be engaged, such that energy may be transmitted from the drive shaft via the gearbox to the first gearbox shaft, via the first motor clutch to the first shaft. From the first shaft, energy may be transmitted via the compressor clutch to the compressor shaft so as to drive the braking compressor. The braking compressor utilises the energy to compress air.

When the compressor clutch is engaged, the braking compressor will rotate with a compressor speed determined by the speed of the first shaft and any gearing provided between the first shaft and the compressor. As such, the compressor shaft may be subject to substantial torque. Furthermore, to enable mechanical engagement from the drive shaft via the gearbox and the first gearbox shaft, to the first shaft and further to the braking compressor, the torques involved in each mechanical connection need to be controlled.

The provision of the first motor clutch and the compressor clutch provides for a first range of measures for handling the torques, by selectively engaging and disengaging the clutches.

Further, as mentioned in the above, the arrangement comprises mass flow rate controlling means arranged for controlling the air mass flow rate through the braking compressor. By controlling the mass flow rate through the braking compressor, the compressor power and hence the torque on the compressor shaft may be controlled for a specific compressor speed. This control provides for a second range of measures for handling the torques.

Thus, the provision of the first motor clutch, and the compressor clutch in combination with the mass flow rate controlling means provides for a vehicle arrangement which may be controlled for providing braking as will be further described in the below.

Optionally, the compressor shaft is arranged to be mechanically connected to the first shaft via one or more gears providing a gear ratio between the first shaft and the compressor shaft.

The provision of one or more gears means that the speed of the compressor shaft may be considerably increased as compared to the speed of the first shaft. A higher speed of the compressor shaft implies higher torque from the braking compressor. As will be further described in the below, the mass flow rate controlling means arranged for controlling the air mass flow rate through the braking compressor may be used so as to control also these relatively high torques.

For example, the gear ratio may be at least 3, such as at be least 4, such as at least 6. For example, the gear ratio may be between 3 to 9, such as between 4 to 8.

For example, the gear ratio may be a fixed gear ratio. In other words, the gear ratio is not adjustable.

The mass flow rate controlling means may provide for control of the mass flow rate to at least a plurality of selectable mass flow rates in a range between a minimum mass flow rate and a maximum mass flow rate.

The mass flow rate controlling means may provide for continuous control of the mass flow rate between a minimum mass flow rate and a maximum mass flow rate.

Optionally, the mass flow rate controlling means comprises a means for controlling the air inflow into the braking compressor. By controlling the air inflow it is possible to adapt the air flow rate so as to achieve the desired control of the compressor torque.

Optionally, the mass flow rate controlling means comprises a throttle valve arranged to control the air inflow to the compressor.

The throttle valve may enable continuous control of the air inflow between a fully closed and a fully open position of the throttle valve.

Optionally, the vehicle arrangement may further comprise a braking resistor. Such a braking resistor may be arranged in addition to the braking compressor so as to dissipate further braking energy from the drive shaft in a braking situation.

For example, the vehicle arrangement may comprise a braking resistor dissipating electric energy from the retarding electrical motors.

Optionally, the braking resistor may be arranged to be cooled by an exhaust from the braking compressor. As such, the braking energy used by the braking compressor to compress air may be used to further promote efficient dissipation of energy in a braking situation, by the compressed air from the exhaust of the compressor being used for cooling a braking resistor.

Optionally, the arrangement may comprise a second electric motor comprising a second shaft, being arranged to be mechanically connected to a drive shaft of the vehicle via a gearbox. When the arrangement comprises a second electric motor, this second electric motor may be used for propelling or braking the vehicle by the second shaft being connected to the gearbox while the first shaft is disengaged from the gearbox by the first motor clutch being disengaged.

Further, the arrangement may comprise additional electric motors, for example the vehicle arrangement may comprise three or four electric motors.

Optionally, the first electric motor is connected to a battery. Optionally, when the vehicle arrangement comprises a plurality of electric motors, such as two, three or four electric motors, all of the two, three or four electric motors may be connected to a battery.

In a second aspect, there is provided a method for controlling a vehicle arrangement for braking according to the first aspect.

As such, there is provided a method for controlling a vehicle arrangement for braking according to the first aspect comprising:

detecting an upcoming or present braking situation,
ensuring that the first motor clutch is disengaged,
ensuring that the compressor clutch is engaged,
synchronizing the speed of the first shaft of the first electric motor with a speed of the first gearbox shaft while controlling a mass flow rate of the braking compressor so as to maintain a compressor torque on the compressor shaft below a predetermined maximum torque limit; and
engaging the first motor clutch such that the first shaft is coupled to the gearbox via the gearbox shaft and the gearbox, and the braking compressor is coupled to the first shaft via the one or more gears.

Thus, in accordance with the proposed method, the speed of the first shaft is synchronized with the speed of the first gearbox shaft before engagement of the first motor clutch. Hence, the engagement of the first motor clutch may be made without sudden jerks or excessive torque being applied to the first motor clutch, thus diminishing the risk for excessive wear and/or breakage.

Further, the method involves performing the synchronization while the mass flow rate of the braking compressor is controlled so as to maintain the compressor torque on the compressor shaft below a predetermined maximum torque limit. Hence, when the first motor clutch is engaged, the compressor clutch is already engaged, meaning that the braking compressor is mechanically connected to the gearbox shaft by engagement of the first motor clutch, and with a controlled torque.

Optionally, the method comprises detecting an upcoming braking situation, and the step of engaging the first motor clutch is made prior to arriving at the upcoming braking situation. As such, the method may be used to meet the requirement for applying braking already before arriving at an upcoming braking situation.

Optionally, when the vehicle arrangement further comprises a second electric motor having a second shaft, the method steps as described in the above may be performed with the second shaft being engaged to the gearbox. As such, the vehicle may be propelled or retarded using the second electric motor, while the steps involving the disconnection of the first electric motor by disengagement of the first motor clutch, the synchronisation and the control of the mass flow rate are performed. Again, this enables the method to be used to meet the requirement for applying braking already before arriving at an upcoming braking situation without compromising with the ability of propelling the vehicle before arriving at the upcoming braking situation Optionally, the method further comprises the step of, before engaging the first motor clutch controlling a mass flow rate of the braking compressor so as to maintain a compressor torque on the compressor shaft below a predetermined engagement torque limit when engaging the first motor clutch.

As such, at the instant when the first motor clutch is engaged, the braking compressor may be arranged to provide a relatively low power. Once engaged, the braking compressor power may be regulated by regulating the mass flow rate of the braking compressor.

Optionally, the method comprises the step of, after engaging the first motor clutch, controlling a mass flow rate of the compressor so as to maintain a compressor torque on the compressor shaft below a predetermined maximum torque limit during the entire duration of the braking situation.

The predetermined maximum torque limit may be set in view of the requirements of the components of the mechanical connections of the vehicle arrangement, so as to spare the mechanical connections from excessive wear or from the risk of breaking. Such mechanical connectors may be e.g. the compressor clutch and/or the one or more gears between the compressor and the first shaft.

Limiting the compressor torque below a predetermined maximum torque limit implies that the braking power provided by the braking compressor is limited. It will be understood that the arrangement and method as described herein may be used in combination with other braking methods such as with methods involving storage of energy in one or more batteries, use of resistors etc, for taking up braking energy not susceptible for driving the braking compressor in view of the predetermined maximum torque limit.

In a third aspect of the invention, there is provided a method. As such there is provided a method for braking a motor shaft of an electric motor arranged to be operatively mechanically connected to a drive shaft in a vehicle arrangement of a vehicle, the vehicle arrangement comprising a compressor comprising a compressor shaft being mechanically connected to the motor shaft, the method comprising:
  using information indicative of the compressor speed of the compressor, and
  using information indicative of the compressor torque as a function of the compressor speed and of a mass flow rate through the compressor, and
  controlling the mass flow rate of the compressor so as to maintain a compressor torque on the compressor shaft no greater than predetermined maximum torque limit.

When used in combination with the second aspect of the invention, this implies that the motor shaft is the first shaft as described in relation to the second aspect.

As such, the method according to the third aspect of the invention may be used for limiting the compressor torque and thus the braking power received from the compressor during braking. For example, if a gear change takes place during braking, this means that the motor shaft speed and hence the compressor torque may increase or decrease swiftly. In accordance with the method according to the third aspect, the mass flow rate of the compressor is controlled so as to maintain the compressor torque on the compressor shaft below a predetermined maximum torque limit, such that the compressor and/or gearing do not risk excessive wear and/or breakage e.g. at a gear shift.

As such, the method may be used for controlling the compressor torque of a braking compressor and comprise:
  receiving a compressor torque request; and
  using information indicative of the compressor speed of the compressor, and
  using information indicative of the compressor torque as a function of the compressor speed and of a mass flow rate through the compressor;
  when the compressor torque request is lower than the predetermined maximum torque limit,
  controlling the mass flow rate of the compressor such that the compressor torque fulfils said compressor torque request
  or
  when the compressor torque request is higher than or equal to the predetermined maximum torque limit
  controlling the mass flow rate of the compressor such that the compressor torque is at said predetermined maximum torque limit.

Optionally, the compressor torque request may be derived from a braking torque request or a braking power request required for the braking of a vehicle.

Thus, when the brake torque request implies a compressor torque request which is higher than the predetermined maximum torque limit, other braking means of the vehicle may be applied to achieve sufficient braking.

Optionally, the compressor torque request may be derived from an exhaust temperature request to provide a desired temperature of the exhaust air from the compressor.

The method of the third aspect of the invention is not limited for use with the second aspect or the first aspect of the invention. However, the features and advantages of the third aspect are, as will be understood by the following description, advantageously applicable to the second and/or first aspect of the invention.

Optionally, controlling the mass flow rate comprises controlling the mass flow rate to one out of at least a plurality of selectable mass flow rates in a range between a minimum mass flow rate and a maximum mass flow rate.

Optionally, controlling the mass flow rate comprises continuously controlling the mass flow rate between a minimum mass flow rate and a maximum mass flow rate.

Optionally, the method further comprises controlling the mass flow rate by controlling the air intake to the compressor. By controlling the air intake, i.e. the inflow of air, it is possible to adapt the mass flow rate so as to achieve the desired control of the compressor torque.

Optionally, the method comprises controlling the air intake to the compressor by controlling a throttle valve arranged upstream the compressor.

As such, a throttle valve may enable continuous control of the air intake between a fully closed and a fully open position of the throttle valve.

Optionally, the information indicative of the compressor torque comprises information indicative of the compressor power as a function of the compressor speed and the mass flow rate through the compressor. As such, e.g. a mapping of compressor power as a function of compressor speed and mass flow rate through the compressor may be used to provide the information indicative of the compressor torque. For example, such a mapping may be a mapping of compressor power as a function of compressor speed and air intake to the compressor, such as compressor power as a function of compressor speed and diameter of an air intake orifice to the compressor.

Optionally, the information indicative of the compressor speed comprises information of the rotating speed of the motor shaft.

The compressor may optionally be mechanically connected to the shaft via a gear arrangement providing gear ratio between the shaft and the compressor. For example, the gear ratio may be at least 3, such as at least 4, such as at least 6. For example, the gear ratio may be from 3 to 9, such as from 4 to 8.

As such, optionally the information indicative of the compressor speed comprises information of the gear ratio arrangement.

In a fourth aspect of the invention, there is provided a control unit. As such, there is provided a control unit for operating a vehicle arrangement comprising a compressor comprising a compressor shaft being mechanically connected to a first shaft in a vehicle arrangement, such as a vehicle arrangement according to the first aspect, wherein the control unit is configured to perform the method according to the second aspect and/or the method according to the third aspect.

In a fifth aspect of the invention, there is provided a vehicle. As such, there is provided a vehicle comprising the vehicle arrangement according the first aspect of the invention and/or being in communication with a control unit according to the fourth aspect.

In a sixth aspect of the invention there is provided a computer program. As such, there is provided a computer program comprising program code means for performing the method of the second and/or the third aspect of the invention, when the program is run on the control unit of the fourth aspect.

In a seventh aspect of the invention there is provided a computer readable medium. As such, there is provided a computer readable medium carrying a computer program comprising program code means for performing the method of the second and/or third aspect of the invention, when the program product is run on the control unit of the fourth aspect.

Advantages and effects of the fourth, fifth, sixth and seventh aspects of the invention are largely analogous to the advantages and effects of the first, second and third aspects of the invention. Furthermore, all embodiments of the fourth, fifth, sixth and seventh aspects of the invention are combinable with all embodiments of the first, second and third aspects of the invention, and vice versa.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
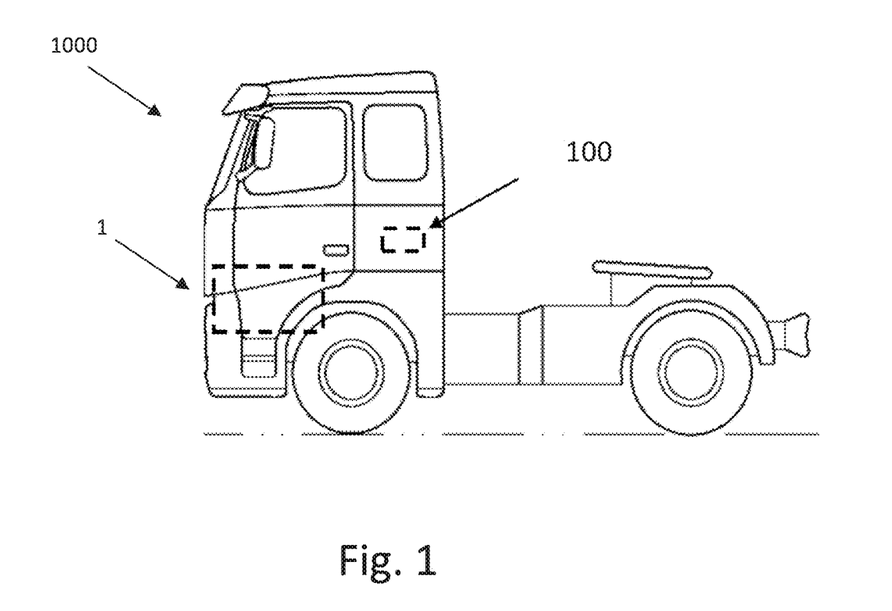
FIG. 1 is a side view of a vehicle according to an example embodiment of the invention.

FIG. 1 depicts a side view of a vehicle 1000 according to an example embodiment of the invention. The vehicle 1000 is here a truck, more specifically a heavy-duty truck for towing one or more trailers (not shown). Even though a heavy-duty truck 1000 is shown it shall be noted that the invention is not limited to this type of vehicle but may be used for any other type of vehicle, such as a bus, construction equipment, e.g. a wheel loader and an excavator, and a passenger car. The invention is also applicable for other applications not relating to vehicles as long as one electric motor or a plurality of electric motors is utilized.

The vehicle 1000 comprises a vehicle arrangement 1. The vehicle arrangement 1 comprises one or more electric motors (not shown in FIG. 1) which are used for creating a propulsion force to the vehicle 1000.

The vehicle 1000 further comprises a control unit 100 according to an example embodiment of the invention. The control unit 100 is thus used for operating the vehicle arrangement 1. Even though an on-board control unit 100 is shown, it shall be understood that the control unit 100 could also be a remote-control unit 100, i.e., an off-board control unit, or a combination of an on-board and off-board control unit. The control unit 100 may be configured to control the vehicle arrangement 1 by issuing control signals and by receiving status information relating to the vehicle arrangement 1.

The control unit 100 is an electronic control unit and may comprise processing circuitry which is adapted to run a computer program as disclosed herein. The control unit 100 may comprise hardware and/or software for performing the method according to the invention. In an embodiment the control unit 100 may be denoted a computer. The control unit 100 may be constituted by one or more separate sub-control units. In addition, the control unit 100 may communicate by use of wired and/or wireless communication means.

Figure 2:
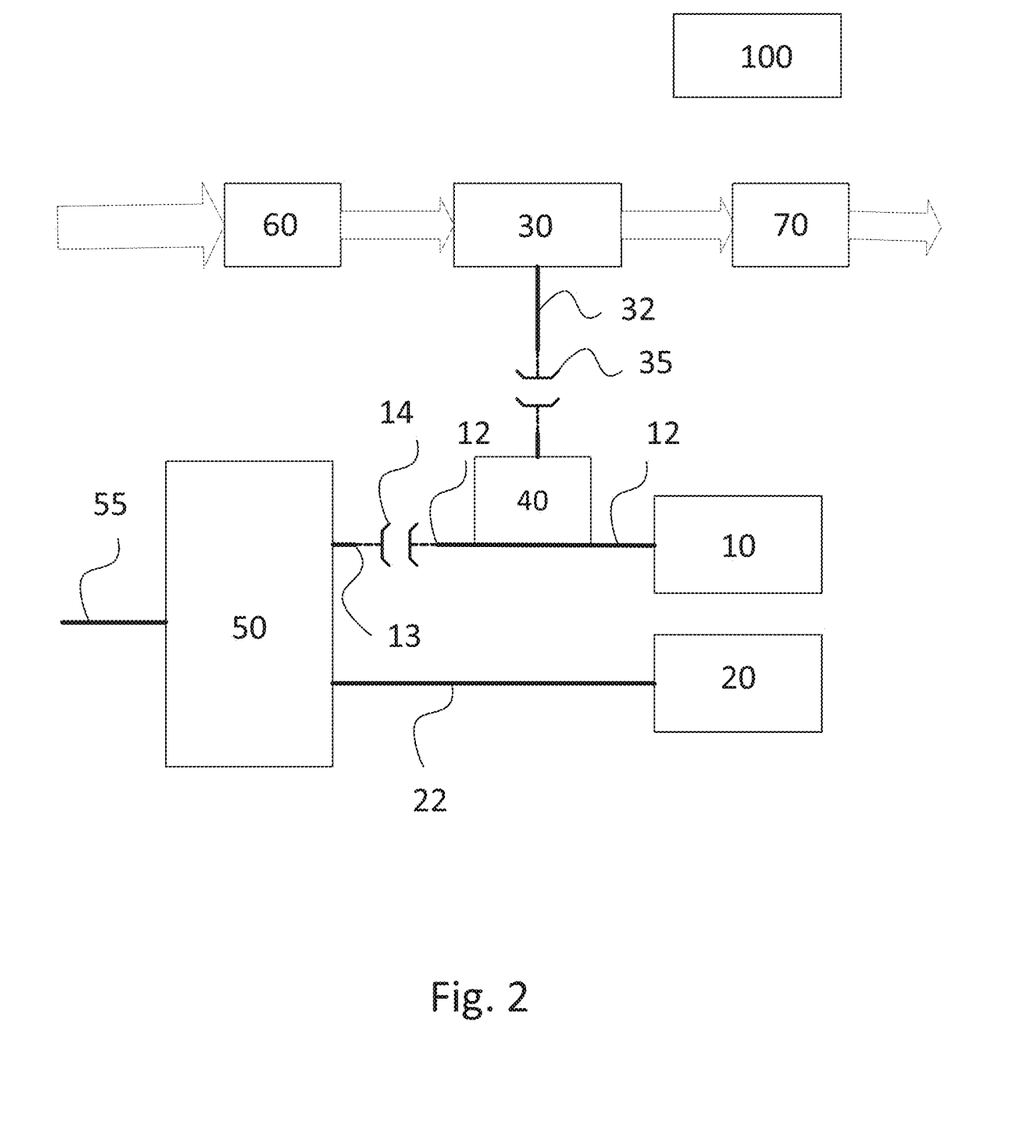
FIG. 2 is a schematic view of vehicle arrangement for braking, according to an example embodiment of the first aspect of the invention.

FIG. 2 depicts a schematic illustration of a vehicle arrangement 1 according to an example embodiment of the invention, wherein the vehicle arrangement 1 is arranged for propulsion of a vehicle, such as the vehicle 1000 as shown in FIG. 1.

The vehicle arrangement 1 comprises at least one electric motor, optionally a plurality of electric motors. For example, and as illustrated in FIG. 2, the vehicle arrangement 1 may comprise a first electric motor 10 and a second electric motor 20. However, it is envisaged that three, four our more electric motors may be comprised in the vehicle arrangement 1.

The one or more electric motors 10, 20 may for example be connected to an electrical storage system, such as a system comprising one or more batteries and/or to a fuel cell system.

Each electric motor 10, 20 comprises a shaft 12, 22 being mechanically connected to a gearbox 50, which is in turn connected to the driving shaft 55 of the vehicle 1000 for transmitting power from one or more of the electric motors 10, 20 to a traction system of the vehicle 1, for example to the traction wheels of the vehicle 1000.

Thus, the vehicle arrangement 1 may, as in FIG. 2, comprise a first electric motor 10 having a first shaft 12, and a second electric motor 20 having a second shaft 22. The first shaft 12 is connected to the gearbox 50 via a first motor clutch 14 and a first gearbox shaft 13. Further, a braking compressor 30 is arranged to be mechanically connected to the first shaft 12 via a compressor clutch 35, such that when the compressor clutch 35 is engaged, the first shaft 12 drives the compressor shaft 32. As such, when the first motor clutch 14 and the compressor clutch 35 are both engaged, the braking compressor 30 may be used in a braking situation of the vehicle 1 for dissipating energy transmitted from the drive shaft 55 via the gearbox 50, the first gearbox shaft 13, and the first shaft 12 to the braking compressor 30. The braking compressor 30 will utilise the energy to compress air, which compressed air may be used for various purposes in the vehicle 1000 such as e.g. cooling.

The compressor shaft 32 may, as illustrated in FIG. 2, be arranged to be mechanically connected to the first shaft 12 via one or more gears 40 providing a gear ratio between the first shaft 12 and the compressor shaft 32.

Generally, such a gear ratio may be a fixed gear ratio. For example, the gear ratio may be in the range from 6 to 8, such as 8. Accordingly, by the gear ratio, a rotation speed of the first shaft 12 may result in a higher rotation speed of the compressor shaft.

In a vehicle arrangement comprising a braking compressor 30 being mechanically connected to the gearbox 50, such as in the example arrangement 1 of FIG. 2, the braking compressor 30 will experience high compressor speeds (i.e. rotation speed of the compressor) and may also be subject to abrupt changes in compressor speed.

The motor shaft speed (i.e. rotation speed of the shaft) will vary as a function of the vehicle speed and the gearing applied in the gearbox. As such, the speed of the first shaft 12 and the second shaft 22 of the first and second electric motors 10, 20, will vary at different vehicle speeds and at different gearing in the gearbox 50.

Figure 6:
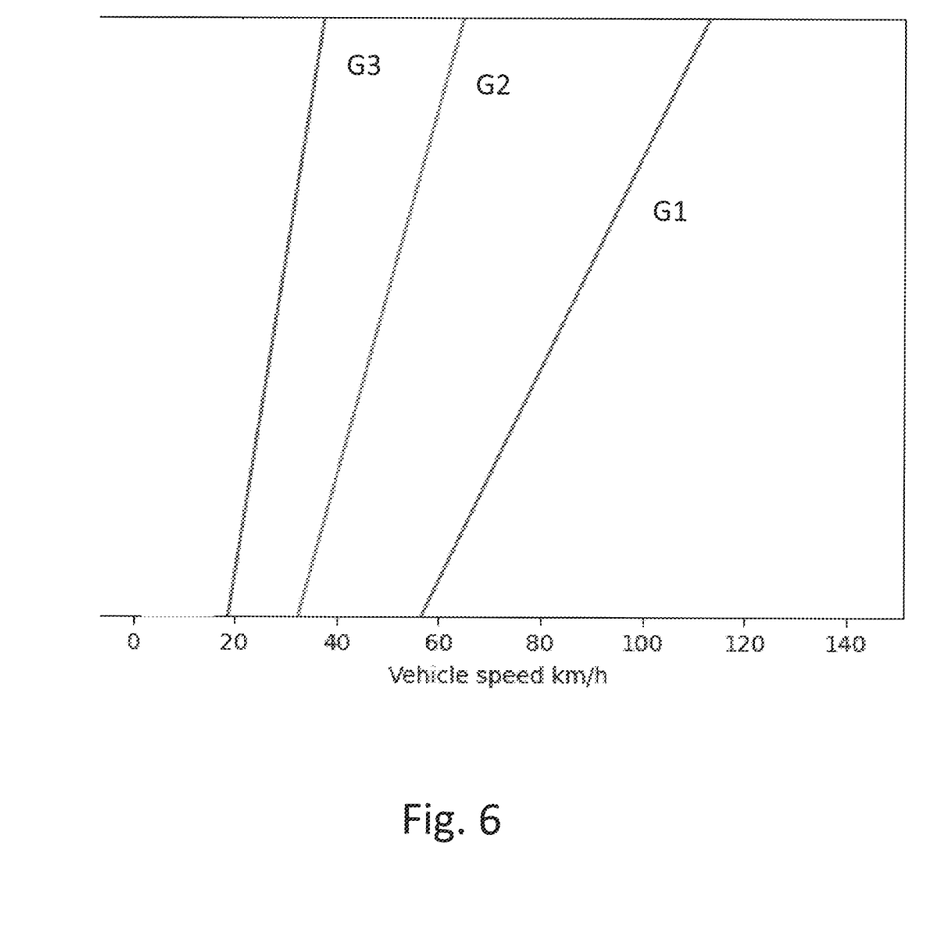
FIG. 6 is an example diagram of the speed of a braking compressor at different vehicle speeds and different gears.

FIG. 6 is an example diagram for illustrating the speed of the compressor shaft 32 of the braking compressor 30 when the compressor clutch 35 is engaged to the first shaft 12 with a gearing 40 providing a gear ratio. It will be understood, that due to the gear ratio of the gearing 40 between the first shaft 12 and the compressor shaft 32, the speed of the compressor shaft 32 may be considerably higher than the speed of the first shaft 12. For example, compressor speeds may be in the range of 20 000 to 60 000 rpm. The diagram illustrates schematically the speed of the compressor shaft 32 at different vehicle speeds and at different gearing (G1, G2, G3) in the gearbox 50

Increasing speeds of the compressor shaft 32 implies increased power developed by the braking compressor 30, and also an increased torque provided via the shaft and to the one or more gears 40.

In prior art arrangements, there is accordingly a risk that the high torque implies that the mechanical components involved in the connection between the first gearbox shaft 13, the first shaft 12 and the compressor shaft 32, such as the one or more gears 40, are overloaded resulting in swift wear or in breakage of the mechanical components.

As will be further described in the below, the presently proposed vehicle arrangement 1 and methods utilise control of the first motor clutch 14 and the compressor clutch 35 to partly alleviate this problem.

In addition, the vehicle arrangement 1 comprises a mass flow rate controlling means 60 arranged for controlling the air mass flow rate through the braking compressor 30. By provision of the mass flow rate controlling means 60, it is possible to control the power of the braking compressor 30, and thus the torque developed by the compressor 30, at different speeds of the compressor shaft 32. Thus, the mass flow rate controlling means 60 enables maintaining the compressor torque, ie. the torque on the compressor shaft 32 below a predetermined maximum torque limit.

The mass flow rate controlling means 60 may, as illustrated in FIG. 2, be a means for controlling the air inflow into the braking compressor 30. Control of the air inflow enables accurate control.

For example, the mass flow rate controlling means 60 may be a throttle valve 60 arranged to control the air inflow to the braking compressor 30. A throttle valve 60 is an example of a valve which may enable continuous control of the air intake and thus the mass flow rate between a minimum mass flow rate and a maximum mass flow rate.

Figure 7:
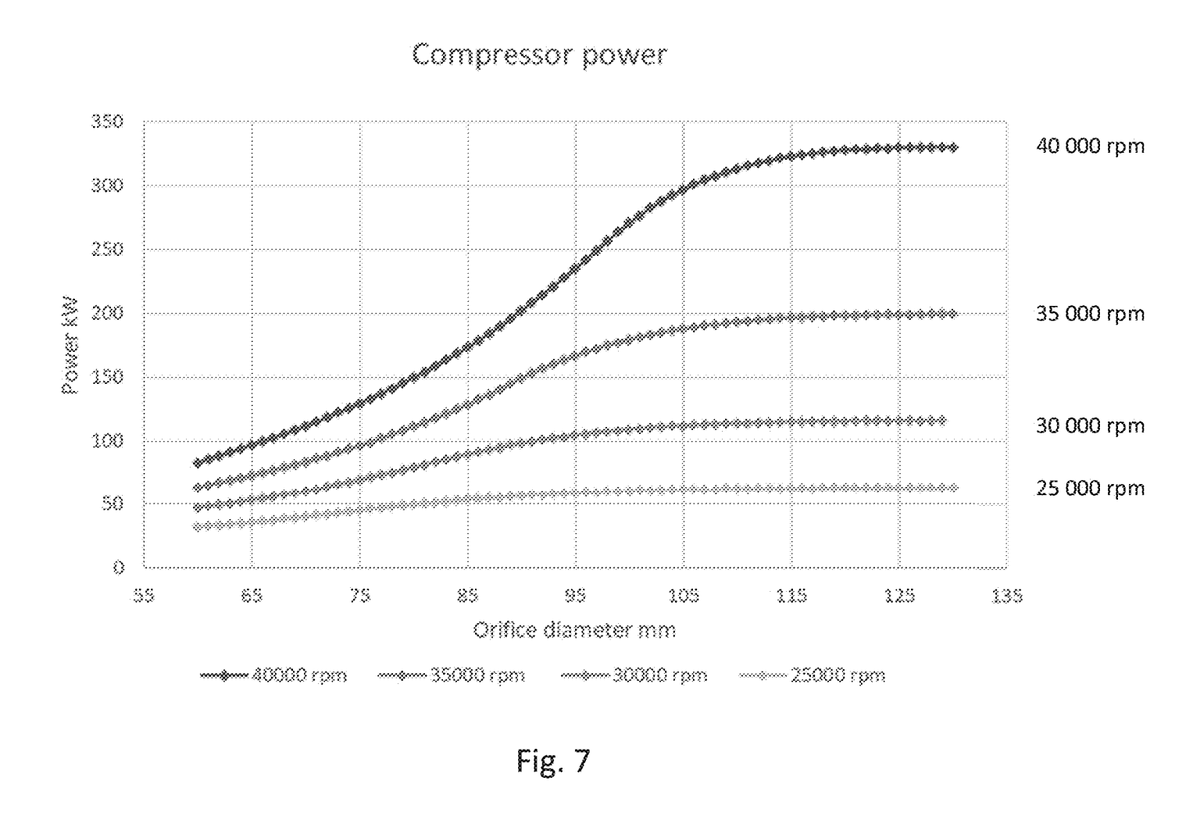
FIG. 7 is an example diagram of the compressor power at different compressor speeds as a result of varying diameter of an air throttle intake.
Figure 8:
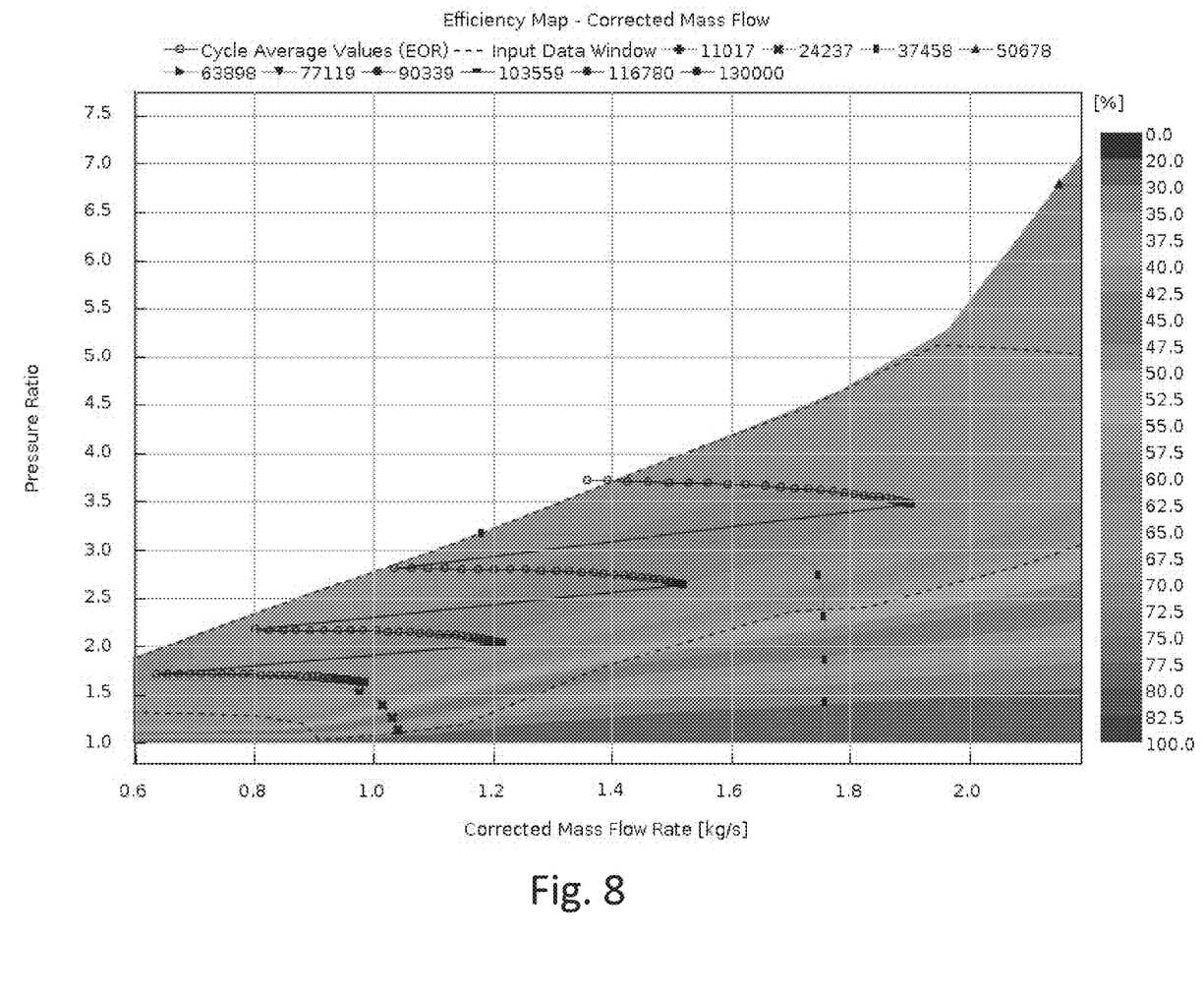
FIG. 8 is a map over the pressure ratio vs the corrected mass flow rate of an example braking compressor.

FIG. 7 illustrates an example of compressor power (which is proportional to the torque) developed by an example compressor at four different compressor speeds, and as a function of the orifice diameter of a throttle intake valve to the compressor. As seen in FIG. 8, by diminishing the orifice diameter of the throttle intake valve, i.e. diminishing the mass flow rate of the compressor, the power and thus the torque may be reduced. As such, to maintain the compressor torque below a predetermined torque limit when the compressor speed is increased as a result of an increase in the speed of the first shaft, the orifice diameter of the throttle intake valve may be reduced.

FIG. 8 illustrates an example of a mapping of corrected mass flow rate versus pressure ratio of a compressor. In this example, the mass flow rate has been varied by controlling the air intake to the compressor using a throttle valve with controllable orifice diameter, at different compressor speeds. FIG. 8 illustrates how compressor operating points moves in the map when the throttling is applied. As seen, the operating points imply that the compressor pumping limit may be avoided.

By controlling the compressor torque to remain under a predetermined maximum torque value, the power developed by the braking compressor 30 and thus the amount of braking energy from the drive shaft 55 used by the braking compressor will also be limited. It is envisaged that the vehicle arrangement 1 described herein may comprise one or more additional braking elements for dissipating braking energy, which braking elements may compensate for the limitation in the braking provided by the compressor.

For example, the vehicle arrangement 1 may comprise one or more sensors to sense the air pressure in the air intake to the compressor 30 downstream the mass flow control means 60. As such, information from the sensor may be used to derive the compressor torque. The mass flow control means 60 may be adjusted so as to obtain a desired compressor torque by controlling the control means 60 towards a desired air pressure signal from the one or more sensors.

The vehicle arrangement 1 may, as illustrated in FIG. 2, further comprise a flow restrictor 70 arranged downstream the braking compressor 30. The flow restrictor 70 may be controllable as already known in the art. As such, the flow restrictor 70 may have an impact on the mass flow rate through the compressor 30. However, it is believed that the primary regulation of the mass flow rate may advantageously be made by controlling the air intake to the compressor 30.

Figure 3:
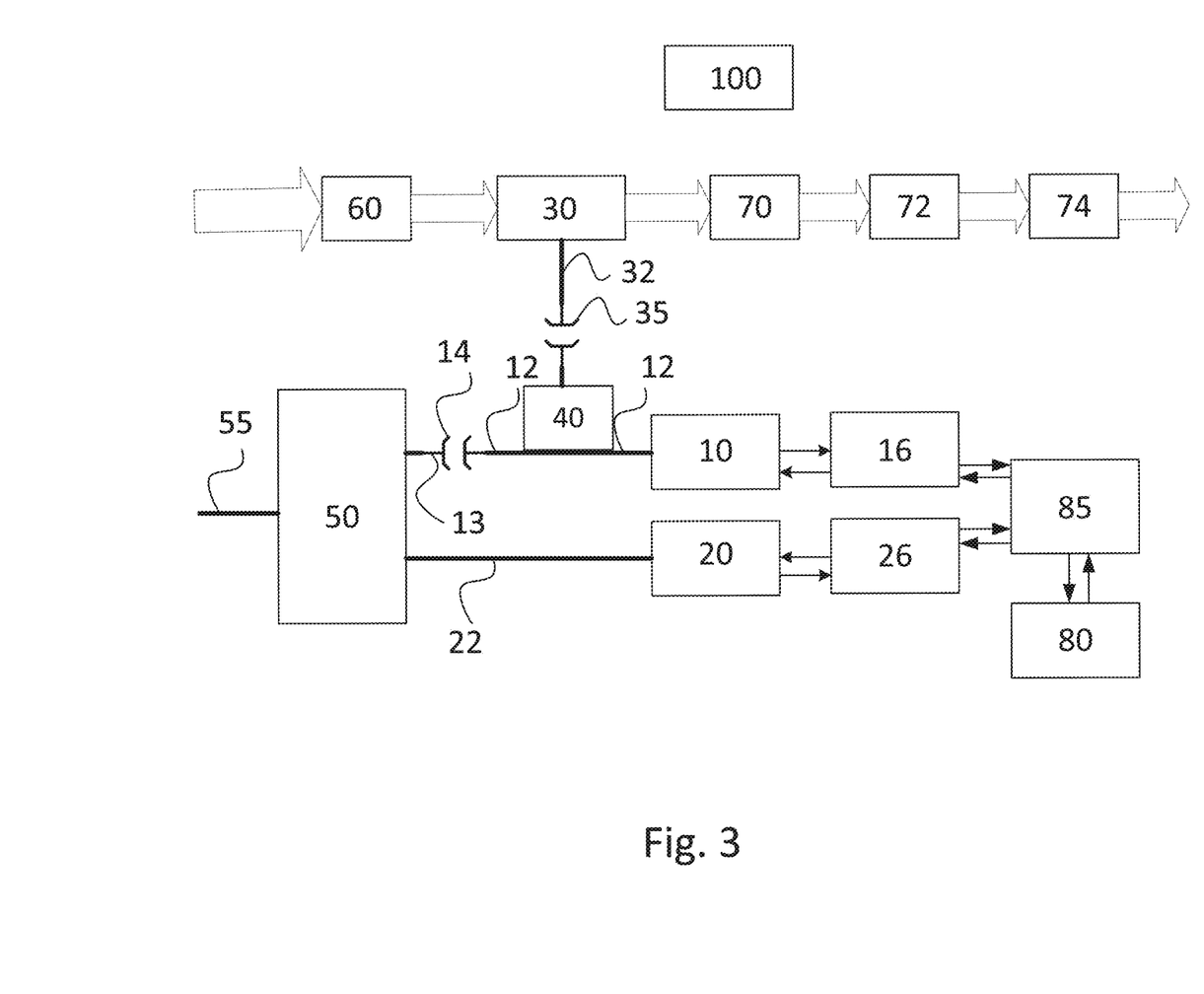
FIG. 3 is a schematic view of a vehicle arrangement for braking, according to another example embodiment of the first aspect of the invention.

FIG. 3 illustrates a second example of a braking arrangement 1. The braking arrangement 1 comprises all of the features of the braking arrangement 1 as illustrated in FIG. 2, to which additional elements are added as examples.

For example, and as in the example arrangement illustrated in FIG. 3, the vehicle arrangement 1 may further comprise a braking resistor 72. Such a braking resistor 72 may be arranged in addition to the braking compressor 30 so as to dissipate further braking energy from the drive shaft 55 in a braking situation.

Optionally, such additional braking elements, for example a braking resistor 72 may be arranged to be cooled by an exhaust from the braking compressor 30. As such, the braking energy used by the braking compressor to compress air may be used to further promote efficient dissipation of energy in a braking situation, by the compressed air from the exhaust of the compressor being used for cooling a braking resistor.

The braking arrangement 1 may further, as illustrated in FIG. 1 comprise one or more batteries 80.

As mentioned in the above, the one or more electric motors may be driven by any arrangement for providing electrical energy, such as one or more batteries and/or fuel cell systems. Also a vehicle not using batteries to provide the propulsion of the vehicle, may comprise one or more batteries to store energy useful for other purposes.

In a braking situation, a battery 80 may be used to store energy from the drive shaft 55, using e.g. resistors and/or retarders arranged for this purpose.

The braking arrangement 1 may further comprise a first traction inverter 16 for the first electric motor 10, and a second traction inverter 26 for the second electric motor 20. The braking arrangement may further comprise a junction box 85 in communication with the first and second traction inverters 16, 26. The junction box 85 is in this example further in communication with a battery 80.

The braking resistor 72 may be air cooled via an air cooled resistor element arranged downstream the braking compressor 30, such as downstream the flow restrictor 70. Further, the vehicle arrangement 1 may comprise a muffler 74, for example as illustrated in FIG. 3, arranged downstream the braking resistor 72 comprising the air cooled resistor element. The braking resistor 72 may be electrically connected to any electric system in the vehicle, such as to suitable components of the braking arrangement 1.

Figure 4:
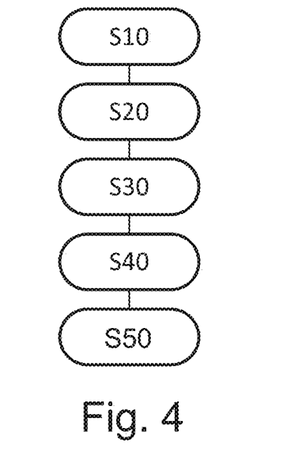
FIG. 4 is a flowchart of a method according to an example embodiment of a second aspect of the invention.

FIG. 1 is a flowchart illustrating a method for controlling a vehicle arrangement 1 for, such as the vehicle arrangement 1 described in relation to FIG. 2 or FIG. 3.

The method comprises the steps of:
detecting an upcoming or present braking situation S10;
ensuring that the first motor clutch 14 is disengaged S20
ensuring that the compressor clutch 35 is engaged S30
synchronizing the speed of the first shaft 12 of the first electric motor 10 with a speed of the first gearbox shaft 13 while controlling a mass flow rate of the compressor 30 so as to maintain a compressor torque on the compressor shaft below a predetermined maximum torque limit S40; and
engaging the first motor clutch 14 S50 such that the first shaft 12 is coupled to the gearbox 50 via the gearbox shaft 13 and the gearbox 50, and the braking compressor 30 is coupled to the first shaft 12 via the one or more gears 40.

As such, the detecting of an upcoming braking situation may be made based on one or more of the following inputs: present or predicted geographical data, such as GPS (Global Positioning System) data, present or predicted topographical data, present or predicted environmental conditions, e.g. weather conditions, such as ambient temperature and/or wind conditions, gross weight of the vehicle, route of the vehicle, the set or predicted speed of the vehicle, present or predicted traffic conditions.

The method comprises the step of, when the compressor clutch 35 is engaged:
synchronizing the speed of the first shaft 12 of the first electric motor 10 with a speed of the first gearbox shaft 13 while controlling a mass flow rate of the compressor 30 so as to maintain a compressor torque on the compressor shaft below a predetermined maximum torque limit; S40. Thus, the method allows for the first shaft 12 to obtain a speed being synchronised with the speed of the first gearbox shaft 13, with the braking compressor 30 in mechanical engagement with the first shaft 12. Thus, the method allows for the braking compressor 30 to be in an applied state when the first motor clutch 14 is engaged, and the first shaft 12 having a speed synchronised with the first gearbox shaft 13, is connected to the first gearbox shaft 13. Thus, the braking compressor 30 may be applied in mechanical connection with the drive shaft 55 in a manner which enables engagement without sudden jerks or excessive torques applied to the mechanical connection.

Also, the synchronisation enables use of relatively simple clutch devices to form the first motor clutch 14, such as a claw clutch.

Further, the method allows for the braking compressor to be applied in mechanical connection with the drive shaft 55 already before an upcoming braking situation, as is required by certain safety regulations.

As such, when the method comprises detecting an upcoming braking situation, the step of engaging the first motor clutch 14 may be made prior to arriving at the upcoming braking situation.

When the vehicle arrangement 1 further comprises a second electric motor 20 comprising a second shaft 22, the method steps as described in the above may be performed with the second shaft 22 being engaged to the gearbox 50. As such, the vehicle may be propelled using the second electric motor 20, while the method as described in the above is performed.

The method may comprise the step of, before engaging the first motor clutch 14, controlling a mass flow rate of the braking compressor so as to maintain a compressor torque on the compressor shaft 32 below a predetermined engagement torque limit when engaging the first motor clutch 14. Such a predetermined engagement torque limit may for example be a minimum torque as available using the mass flow control means at the relevant compressor speed. Thus, at engagement of the first motor clutch 14, the braking compressor 30 may provide a minimum torque, i.e. a minimum power. From this state, once the braking situation is present, the mass flow may for example be continuously increased so as to increase braking power in view of the demands of the current braking situation.

The mass flow rate may be controlled so as to always maintain a compressor torque on the compressor shaft 32 below a predetermined maximum torque limit when the compressor clutch 35 is engaged. As such, it may be ensured that the mechanical connections between the compressor 30 and the first shaft 12 are not overloaded. As mentioned in the above, the predetermined maximum torque limit may be set in view of the requirements of the components of the mechanical connections of the vehicle arrangement, so as to spare the mechanical connections from excessive wear or from the risk of breaking. Such mechanical connectors may be e.g. the compressor clutch 35 and/or the one or more gears 40 between the compressor 30 and the first shaft 12.

Thus, the method may for example involve the step of controlling a mass flow rate of the compressor so as to maintain a compressor torque on the compressor shaft 32 below a predetermined maximum torque limit during the entire duration of the braking situation.

Figure 5:
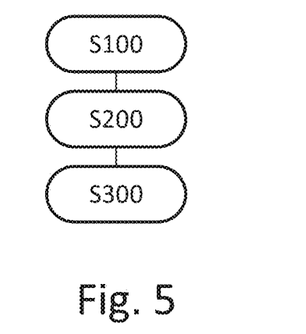
FIG. 5 is a flowchart of a method according to an example embedment of a third aspect of the invention, which may be used with the second aspect.

The step of controlling the mass flow rate of the compressor may be performed by a method comprising the steps of
using information indicative of the compressor speed of the braking compressor 30 S100, and
using information indicative of the compressor torque as a function of the compressor speed and of a mass flow rate through the compressor 30 S200, and controlling the mass flow rate of the braking compressor 30 so as to maintain a compressor torque on the compressor shaft 32 below a predetermined maximum torque limit S300.

As such, this method may be used for braking a motor shaft of an electric motor arranged to be operatively mechanically connected to a drive shaft 55 in any vehicle arrangement 1 of a vehicle 1000, wherein the vehicle arrangement 1 comprises a braking compressor 30 comprising a compressor shaft 32 being mechanically connected to the motor shaft 12.

FIG. 5 is a flow chart illustrating an embodiment of such a method for braking a motor shaft.

When used in combination with the arrangements or methods as described in FIGS. 2 to 4, this implies that the motor shaft is the first shaft 12.

The method for braking a motor shaft may thus be used with the features as described in the above. For example, the method may comprise controlling the mass flow rate to one out of at least a plurality of selectable mass flow rates in a range between a minimum mass flow rate and a maximum mass flow rate. For example, the method comprises controlling the mass flow rate comprises continuously controlling the mass flow rate between a minimum mass flow rate and a maximum mass flow rate.

Optionally, the method further comprises controlling the mass flow rate by controlling the air intake to the compressor. By controlling the air inflow it is possible to adapt the mass flow rate so as to achieve the desired control of the compressor torque. The method may hence comprise controlling the air intake to the compressor by controlling a throttle valve arranged upstream the compressor 30.

Optionally, the information indicative of the compressor torque comprises information indicative of the compressor power as a function of the compressor speed and the mass flow rate through the compressor. As such, e.g. a mapping of compressor power as a function of compressor speed and mass flow rate through the compressor may be used to provide the information indicative of the compressor torque.

Optionally, the information indicative of the compressor speed comprises information of the rotating speed of the motor shaft.

The compressor may optionally be mechanically connected to the shaft 12 via a gear arrangement 40 providing gear ratio between the shaft 12 and the compressor 70. For example, the gear ratio may be at least 3, such as at least 4, such as at least 6. For example, the gear ratio may be 3 to 9, such as 4 to 8.

As such, optionally the information indicative of the compressor speed comprises information of the gear ratio arrangement.

It is to be understood that the present invention is not limited to the embodiments described above and illustrated in the drawings; rather, the skilled person will recognize that many changes and modifications may be made within the scope of the appended claims. For example, although the drawings depict embodiments comprising two electric motors, it will be understood from the above description that several aspects and features of the invention are applicable also to embodiments comprising only one electric motor, or to embodiments comprising more than one electric motor, such as three, four or five electric motors.

The invention claimed is:

1. A vehicle arrangement for braking comprising:
at least a first electric motor comprising a first shaft being arranged to be mechanically connected to a drive shaft of a vehicle via a gearbox, and
a braking compressor comprising a compressor shaft being arranged to be mechanically connected to the first shaft of the first electric motor via a compressor clutch, such that the first shaft drives the compressor shaft, wherein the first shaft is connected to the gearbox via a first motor clutch and a first gearbox shaft, and
a mass flow rate controlling means arranged for controlling the air mass flow rate through the braking compressor.

2. The vehicle arrangement of claim 1, wherein the compressor shaft is arranged to be mechanically connected to the first shaft via one or more gears providing a gear ratio between the first shaft and the compressor shaft.

3. The vehicle arrangement of claim 2, wherein the gear ratio is at least 4.

4. The vehicle arrangement of claim 1, wherein the mass flow rate controlling means comprises a throttle valve arranged to control the air inflow to the braking compressor.

5. The vehicle arrangement of claim 1, further comprising a braking resistor.

6. The vehicle arrangement of claim 5, wherein the braking resistor is arranged to be cooled by an exhaust from the braking compressor.

7. The vehicle arrangement of claim 1, wherein the arrangement comprises a second electric motor comprising a second shaft, being arranged to be mechanically connected to the drive shaft of the vehicle via the gearbox.

8. The vehicle arrangement of claim 7, wherein the first electric motor and the second electric motor are connected to a battery.

9. The vehicle arrangement of claim 1, wherein the first electric motor is connected to a battery.

10. A method for controlling the vehicle arrangement of claim 1, the method comprising:
detecting an upcoming or present braking situation;
ensuring that the first motor clutch is disengaged;
ensuring that the compressor clutch is engaged;
synchronizing a speed of the first shaft of the first electric motor with a speed of the first gearbox shaft while controlling a mass flow rate of the braking compressor so as to maintain a compressor torque on the compressor shaft below a predetermined maximum torque limit; and
engaging the first motor clutch such that the first shaft is coupled to the gearbox via the first gearbox shaft and the gearbox, and the braking compressor is coupled to the first shaft via one or more gears.

11. The method of claim 10, wherein the method comprises detecting an upcoming braking situation, and the step of engaging the first motor clutch is made prior to arriving at the upcoming braking situation.

12. The method of claim 10, comprising the step of, before engaging the first motor clutch controlling a mass flow rate of the compressor so as to maintain a compressor torque on the compressor shaft below a predetermined engagement torque limit when engaging the first motor clutch.

13. The method of claim 10, comprising the step of, after engaging the first motor clutch, controlling a mass flow rate of the compressor so as to maintain a compressor torque on the compressor shaft below a predetermined maximum torque limit during the entire duration of the braking situation.

14. A vehicle comprising the vehicle arrangement of claim 1 and/or being in communication with a control unit for operating the vehicle arrangement comprising the braking compressor comprising the compressor shaft being mechanically connected to the first shaft in the vehicle arrangement, wherein the control unit is configured to perform a method based on braking the first shaft of the first electric motor arranged to be operatively mechanically connected to the drive shaft in the vehicle arrangement of the vehicle, the vehicle arrangement comprising the braking compressor comprising the compressor shaft being mechanically connected to the first shaft, the method comprising:

using information indicative of a compressor speed of the braking compressor, using information indicative of a compressor torque as a function of compressor speed and of a mass flow rate through the braking compressor, and controlling the mass flow rate of the braking compressor so as to maintain the compressor torque on the compressor shaft no greater than a predetermined maximum torque limit.

15. A method for braking a motor shaft of an electric motor arranged to be operatively mechanically connected to a drive shaft in a vehicle arrangement of a vehicle, the vehicle arrangement comprising a braking compressor comprising a compressor shaft being mechanically connected to the motor shaft, the method comprising:

using information indicative of the compressor speed of the braking compressor, using information indicative of compressor torque as a function of compressor speed and of a mass flow rate through the braking compressor, and controlling the mass flow rate of the braking compressor so as to maintain the compressor torque on the compressor shaft no greater than a predetermined maximum torque limit.

16. A method for controlling the compressor torque of a braking compressor using the method of claim 15, further comprising:

receiving a compressor torque request;

using information indicative of the compressor speed of the compressor;

using information indicative of the compressor torque as a function of the compressor speed and of a mass flow rate through the compressor; and when the compressor torque request is lower than the predetermined maximum torque limit, controlling the mass flow rate of the compressor such that the compressor torque fulfils the compressor torque request; or when the compressor torque request is higher than or equal to the predetermined maximum torque limit, controlling the mass flow rate of the compressor such that the compressor torque is at the predetermined maximum torque limit.

17. The method of claim 15, further comprising controlling the mass flow rate by controlling air intake to the braking compressor.

18. The method of claim 17, comprising controlling the air intake to the braking compressor by controlling a throttle valve arranged upstream of the braking compressor.

19. The method of claim 15, wherein the information indicative of the compressor torque comprises information indicative of compressor power as a function of the compressor speed and the mass flow rate through the braking compressor.

20. The method of claim 15, wherein the information indicative of the compressor speed comprises information of the rotating speed of the motor shaft.

21. A computer program comprising program code means for performing the method of claim 15, when the program is run on a control unit for operating the vehicle arrangement comprising the braking compressor comprising the compressor shaft being mechanically connected to the motor shaft in the vehicle arrangement, wherein the control unit is configured to perform the method according to the method for braking the motor shaft of the electric motor arranged to be operatively mechanically connected to the drive shaft in the vehicle arrangement of the vehicle, the vehicle arrangement comprising the braking compressor comprising the compressor shaft being mechanically connected to the motor shaft, the method comprising:

using information indicative of a compressor speed of the braking compressor, using information indicative of a compressor torque as a function of compressor speed and of a mass flow rate through the braking compressor, and controlling the mass flow rate of the braking compressor so as to maintain the compressor torque on the compressor shaft no greater than a predetermined maximum torque limit.

22. A computer readable medium carrying a computer program comprising program code means for performing the method of claim 15, when the program product is run on a control unit for operating the vehicle arrangement comprising the compressor comprising the compressor shaft being mechanically connected to the motor shaft in the vehicle arrangement, wherein the control unit is configured to perform the method according to the method for braking the motor shaft of the electric motor arranged to be operatively mechanically connected to the drive shaft in the vehicle arrangement of the vehicle, the vehicle arrangement comprising a braking compressor comprising the compressor shaft being mechanically connected to the motor shaft, the method comprising:

using information indicative of a compressor speed of the braking compressor, using information indicative of a compressor torque as a function of compressor speed and of a mass flow rate through the braking compressor, and controlling the mass flow rate of the braking compressor so as to maintain the compressor torque on the compressor shaft no greater than a predetermined maximum torque limit.

23. A control unit for operating a vehicle arrangement comprising a braking compressor comprising a compressor shaft being mechanically connected to a first motor shaft in the vehicle arrangement, wherein the control unit is configured to perform a method based on braking the first motor shaft of an electric motor arranged to be operatively mechanically connected to a drive shaft in the vehicle arrangement of a vehicle, the vehicle arrangement comprising the braking compressor comprising the compressor shaft being mechanically connected to the motor shaft, the method comprising:

using information indicative of a compressor speed of the braking compressor, using information indicative of a compressor torque as a function of the compressor speed and of a mass flow rate through the braking compressor, and controlling the mass flow rate of the braking compressor so as to maintain the compressor torque on the compressor shaft no greater than a predetermined maximum torque limit.

* * * * *